United States Patent [19]
Rinn et al.

[11] Patent Number: 4,639,110
[45] Date of Patent: Jan. 27, 1987

[54] AUTOMATIC FOCUSING SYSTEM FOR A PHOTOGRAPHIC CAMERA

[75] Inventors: Juergen Rinn, Wettenberg; Fritz Belitz, Pohlheim-Hausen, both of Fed. Rep. of Germany

[73] Assignee: Minox GmbH, Giessen, Fed. Rep. of Germany

[21] Appl. No.: 779,710

[22] Filed: Sep. 24, 1985

[30] Foreign Application Priority Data

Oct. 10, 1984 [DE] Fed. Rep. of Germany ....... 3437145

[51] Int. Cl.⁴ .............................................. G03B 3/00
[52] U.S. Cl. ................................................... 354/403
[58] Field of Search ................................ 354/400–409

[56] References Cited

U.S. PATENT DOCUMENTS

| | | | |
|---|---|---|---|
| 4,362,372 | 12/1982 | Kiesel | 354/401 X |
| 4,470,681 | 9/1984 | Johnson | 354/403 |
| 4,571,048 | 2/1986 | Sugawara | 354/403 |

*Primary Examiner*—William B. Perkey
*Attorney, Agent, or Firm*—Wells & Wells

[57] ABSTRACT

The application describes an automatic focusing system for photographic cameras. The system functions by means of an infrared light source and an infrared detector. The infrared radiation is focused as a function of object distance in such a manner on the detector that this detector is divided into two detector segments each of which supplies a partial current of which the ratio depends directly on the object distance. The detector is followed by an electronic computing circuit which sets the objective as a function of a preselection implemented by a switch to one of the following modes of operation:

(a) the focus is on the object to be photographed
(b) the depth of field is extended from the object toward the camera
(c) the depth of field is extended from the object to the rear
(d) the depth of field is extended from the object to infinity
(e) the depth of field is extended to between two consecutively targeted objects.

4 Claims, 5 Drawing Figures

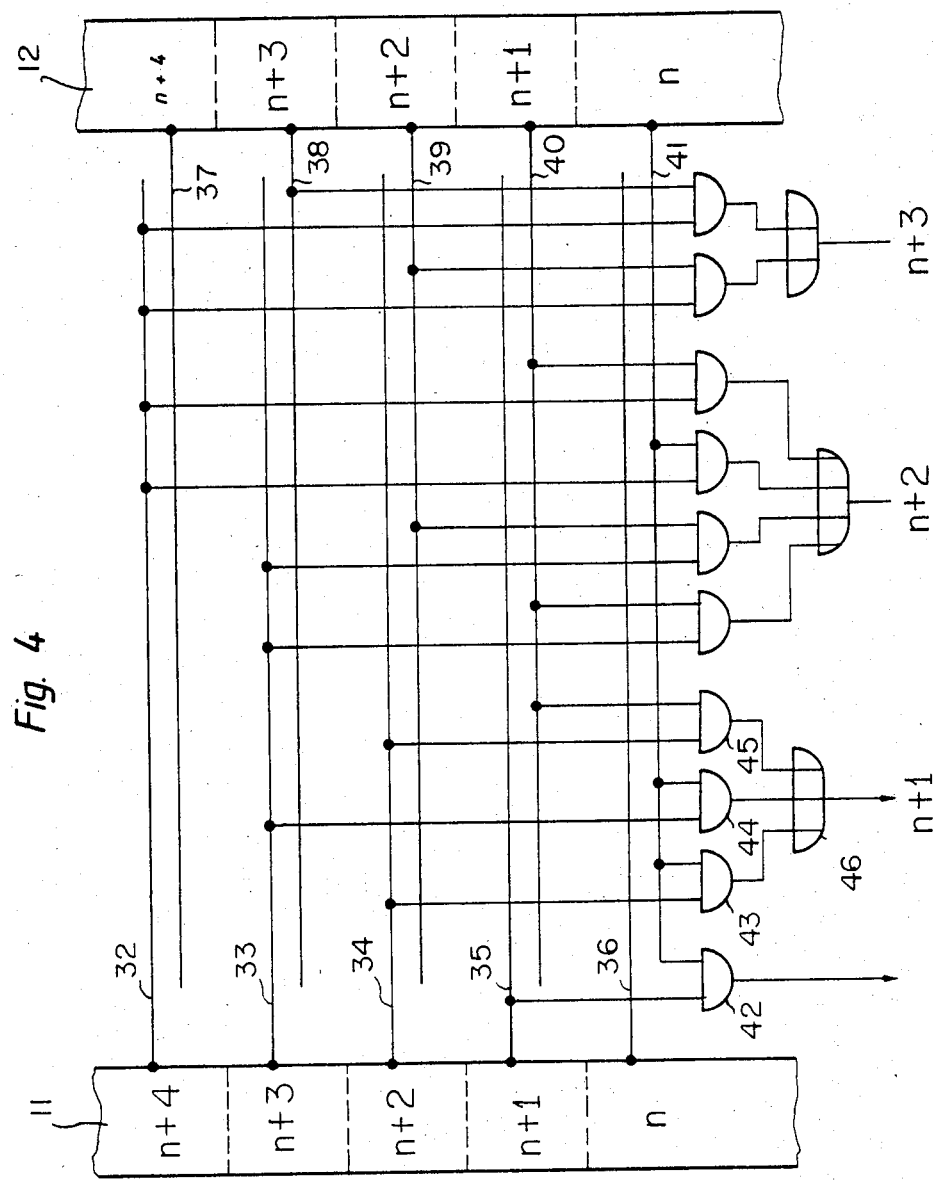

AUTOMATIC FOCUSING SYSTEM FOR A PHOTOGRAPHIC CAMERA

CROSS-REFERENCE TO A RELATED APPLICATION

Applicants claim priority under 35 USC 119 for application No. P 34 37 145 filed Oct. 10, 1984 in West Germany.

BACKGROUND OF THE INVENTION

The invention concerns an automatic focusing system for a photographic camera (a so-called autofocus system), with a memory unit to electronically store distance values and a linkage or computing circuit to ascertain the most advantageous focus of the objective resulting from the measured values, taking into account various requirements of location and depth of field.

Known automatic focusing systems measure the distance to an object within a very limited range and at the center of the image field to be photographed.

This procedure offers good results only when the main object also is located at the image center or when the object as a whole assumes only a slight depth.

This procedure is improved by introducing a memory for the measured values. Thus first aim may be taken of the main object by means of a target, its distance may be measured and the distance so obtained then may be stored in a memory. After that the camera can be pivoted into another direction to achieve the desired image composition. As the shutter is released, the focusing of the objective then takes place according to the distance data contained in the memory and as a result sharp imaging of the previously measured main object is obtained.

In another suggestion according to the West German published application No. 33 44 431 A 1, distance measurements are carried out at several locations within the image field to be photographed. The measuring field of the distance-measuring or ranging device automatically scans the object to be taken. The least object distance is stored and the object to be photographed is focused for that value. This assumes that the main object always shall be nearest the camera.

All these procedures incur the drawback that the camera focusing always is set only to the particular measured object plane. However, as most objects range in depth, it is hardly possible to deliberately sharply image a specific range of depth of the object, even though this is possible in view of the ever present depth of field of the objective. Therefore the depth of field, which is present especially for the smaller stops of the objective, cannot be fully utilized.

SUMMARY OF THE INVENTION

Therefore it is the object of the invention to create an automatic focusing system for a photographic camera which makes possible taking into account the spatial depth range of the object being photographed, and for which the focusing over a specific spatial depth range is possible in relation to the depth of field of the objective as determined by its stop size.

A further embodiment of the invention provides further possibilities making it possible to the user to affect, ie to predetermine as desired the location and the range of the depth of field.

Illustratively in a first operational mode of the focusing system, the objective is conventionally focused on the object to be photographed precisely for the measured distance. The total depth of field present for a particular stop f/number k then is given by geometric optics (see NAUMANN, Optik fuer Konstrukteure, Duesseldorf 1970, p 28) in such a fashion that the depth of the sharply imaged space in front of the geometrically focused plane is given by $U_1$ and the depth of the sharply defined space behind this plane is given by $U_2$:

$$U_1 = [kA_o^2]/[af + Ak];$$

$$U_2 = [kA_o^2]/[af - kA]$$

where $A_o$ = distance to the geometrically focused plane
a = constant (1,000 to 4,000)
k = f/number of the objective
f = focal length of the objective.

In a second mode of operation, the measured object-distance $A_o$ is used as the maximum distance of the present depth of field. Accordingly the entire sharply image space lies *in front* of the measured distance. Thus for this "near focusing", the geometric focus must be at a distance $A_N$ which is less than the measured distance $A_o$, and which is given by $$A_N = A_o - U_2.$$

In a third mode of operation, the measured object-distance $A_o$ is used as the least distance of the depth-of-field present. The entire sharply imaged space therefore is located *behind* the measured distance. The precise focus for this "far focusing" must be at a distance $A_F$ which is larger than the measured distance $A_o$ and which is given by $$A_F = A_o + U_1.$$

In a fourth mode of operation, the invention takes into account the frequent case that sharp imaging is required from the measured object-distance $A_o$ to infinity. This is a special case of the above-described third mode of operation, the so-called "near-infinity" focus. The geometric focus therefore must be set for the distance $A_{oo}$ which is substantially larger than the measured distance $A_o$.

The sharply imaged space will extend to infinity when $$af = kA_{oo},$$

or:

$$A_{oo} = af/k.$$

Therefore $U_1 = \frac{1}{2}A_{oo}$, or, because $U_1$ should equal the measured distance $A_o$, $$A_{oo} = 2A_o.$$

Obviously a sufficient depth of field must be present for this mode of operation to meet those conditions. Otherwise there should be a warning or display so that the required depth of field can be achieved by the appropriate change in parameters (for instance by decreasing the stop aperture, ie increasing the f/number k). In this case it is necessary that the f/number be at least $$k = \frac{1}{2}af/A_o.$$

Lastly, in a fifth mode of operation, the depth of field shall extend between two objects to be photographed which are at different distances from the camera. This requires measuring the distances to the nearer object, $A_1$, and to the more remote object, $A_2$, and this can be implemented by aiming with the distance-measuring or rangefinder means and by temporarily storing the measured values. Focusing then must be on an average distance $A_M$ given by the following relation $$A_M = [2A_1 A_2]/[A_1 + A_2].$$

Again an adequate depth of field must be provided in this case, and this is achieved by selecting an f/number of at least $$k = [\tfrac{1}{2} a f] \cdot [1/A_1 - 1/A_2].$$

This mode of operation may also be appropriately combined with automatically scanning the entire image field, distance measurements being performed for a substantial number of image-field elements, with the measured values being stored. An ideal focusing distance can then be obtained from the least and the largest distances.

The camera user can select the particular mode of operation through suitable means, for instance switches or pushbuttons.

Obviously it is not mandatory that all five modes of operation be combined in one camera, rather the most important ones may be retained.

BRIEF DESCRIPTION OF THE DRAWINGS

A simple and preferred illustrative embodiment of the invention is discussed in further detail below in relation to the drawings.

FIG. 4 is a detail of a circuit diagram to implement the mode of operation 5.

DESCRIPTION OF THE PREFERRED EMBODIMENTS

Figure 1:
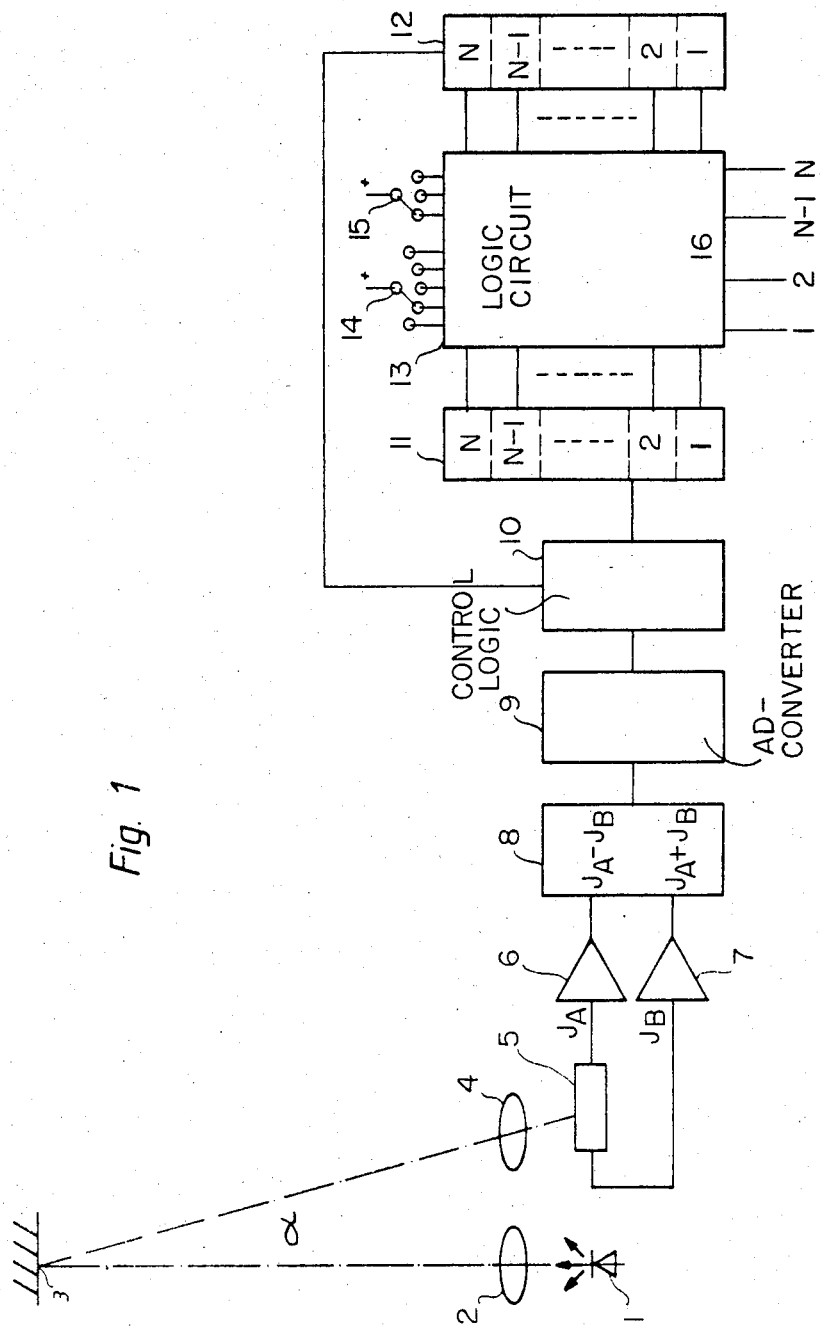
FIG. 1 schematically shows a measuring and computing circuit for an automatic focusing system of the type mentioned, FIG. 1a elucidates the notations used from NAUMANN: OPTIK FUR KONSTRUKTEURE, DUSSELDORF 1970, p 21, 28.
Figure 1A:
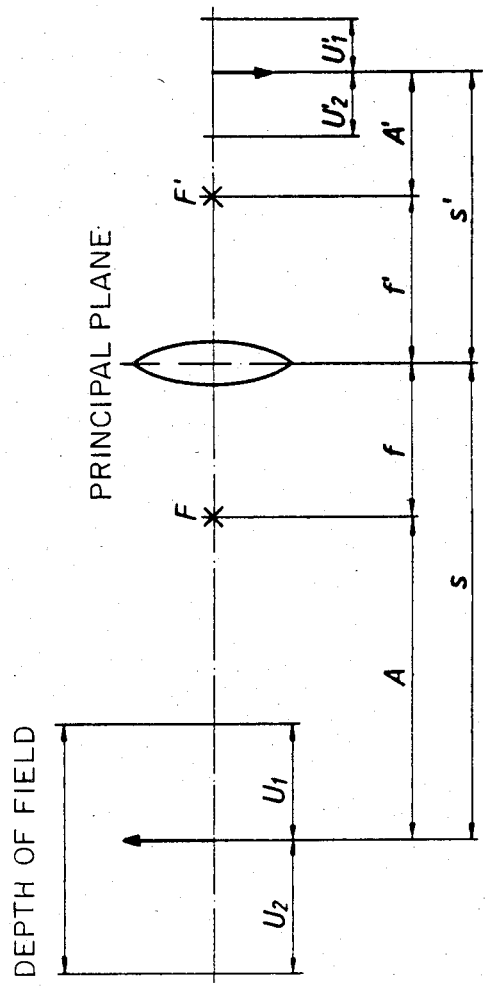

The measurement of distance is performed in manner known per se using the principle of triangulation by an infrared beam. FIG. 1 shows the design of the rangefinder. The radiation from an infrared emitting diode 1 is collimated by the lens 2 and is focused on the object-to-be-photographed 3. The radiation diffusely reflected by the object 3 at an angle alpha is focused by the lens 4 onto the surface of the position detector 5 where it projects an approximate image of the emitting diode 1. The reflection angle alpha and hence the position of the light dot received on the position detector 5 depends on the distance between the rangefinder 1,2,4,5 and the object 3. The position detector 5 generates the two partial currents $J_A$ and $J_B$ which are in a ratio depending on the position of the incident radiation and hence on the distance of the object 3.

The following relation applies:

$$J_A/J_B = [L - X]/X$$

where
L = effective length of the position detector
X = distance of the point of incidence from one end of the position detector.

The two partial currents $J_A$ and $J_B$ are amplified by amplifiers 6 and 7 and are fed to the computing unit 8. This unit forms the sum and the difference of $J_A$ and $J_B$, further the quotient of difference and sum. The quotient contains the pure distance information and is independent of the reflectivity of the object.

Because the objective can be focused in small steps and because on the other hand the distance as measured must be stored, the measured distance-value advantageously is digitized. This is the purpose of the analog-digital converter 9. The digitization takes place in such a manner that each step corresponds to a distance focusing zone.

The number of adjustable distance zones N depends on the focal length and the widest stop aperture of the objective, also on the requirements of sharpness; is a rule N is between 5 and 20.

The digitized distance signal is entered by means of the control circuit 10 into the measurement memory 11. This memory holds N positions each corresponding to a distance zone. The control circuit 10 is designed in such a mannner that only one of the N positions can be occupied and represents the last-measured distance.

Besides the measurement memory 11, a second measurement memory 12, identical with memory 11, is present and becomes operative when two consecutive measurements must be stored. The N outputs of the measurement memories 11 and 12 are linked by a logic circuit 13. By means of the selection switch 14, the signals representing the desired mode of operation are fed into said logic circuit; in the case shown, this selection switch allows selecting five different modes.

The f/numbers or groups of f/numbers set at the objective are fed through the switch 15 in coded form to the logic circuit 13.

Like the memories 11 and 12, the logic circuit comprises N outputs. The output signal from the measurement memory is the input signal of the logic circuit which modifies it in relation to the applied data for mode of operation and f/number.

If for instance the zone n is the result of a measurement, then the selected mode of operation and/or the f/number may cause the output signal of the logic circuit being the zone n+1.

Figure 2:
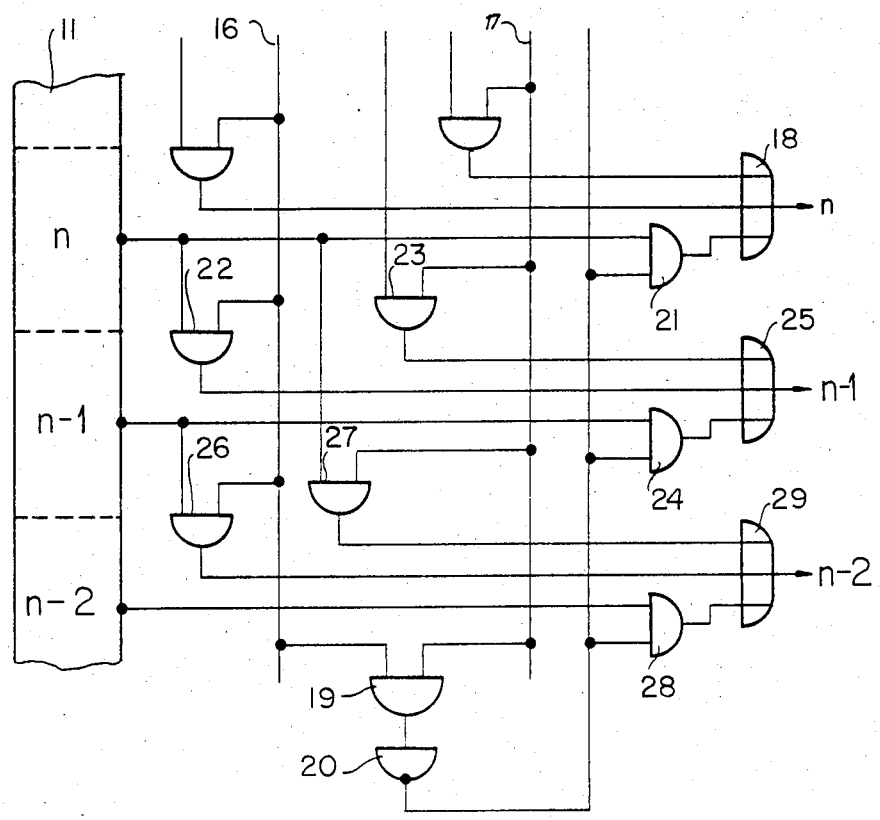
FIG. 2 is a detail of a circuit diagram to implement the modes of operation 1 and 2.

The precise function of the logic circuit 13 in the particular modes of operation is elucidated below in relation to the drawings of FIGS. 2,3 and 4.

In the first mode of operation, the focusing is to be precisely at the measured distance, that is, the zone number may not be altered by the logic circuit. As shown by FIG. 2, this will be the case when the logic level "0" is set on the control conductors 16 and 17.

In this case illustratively the output signal n of the measurement memory 11 passes directly through the OR gate 18 to the output n of the logic circuit.

In the second mode of operation, the focusing must be at a lesser distance, that is, at a lesser zone number, than the measured one, provided that the already set f/number so allows.

To that end, a signal is obtained by an omitted logic linkage of the signals from the mode-switch 14 and the f/number-input 15, which illustratively generates the logic level "1" on the control conductor 16. As a result the OR gate 19, the inverter 20 and the AND gate 21 block the transmission of the signal n through the gate 18. Simultaneously however the transmission of the measurement "n" is opened through the gates 22 and 25, and therefore the selection value "n−1" appears at the output of 25.

Similarly, by selecting another f/number resulting in greater depth of field, the logic level "1" can be generated on the control conductor 17 in the same mode of operation. The logic outputs "n" and "n−1" then will remain blocking for the measurement value "n". But the value "n" then passes through the gates 27 and 29 and appears at the output of 29 as the focusing value "n−2".

In the third mode of operation, the focusing must be at a greater distance, that is at a higher zone number than the measured one, provided the already set depth-of-field so allows. As shown by FIG. 3, this takes place similarly to the second mode of operation, however the logic circuit implements an increase in the zone number. If in this case illustratively the logic level "1" is generated on the control conductor 30, then the measurement "n" turns into the focusing value "n+1" and for a logic level "1" on the control conductor 31, the measurement "n" turns into the focusing value "n+2".

In the fourth mode of operation, the focusing must take place on twice the measured distance, that is, as in the last described, third mode of operation, it must be raised to a higher zone number.

Figure 3:
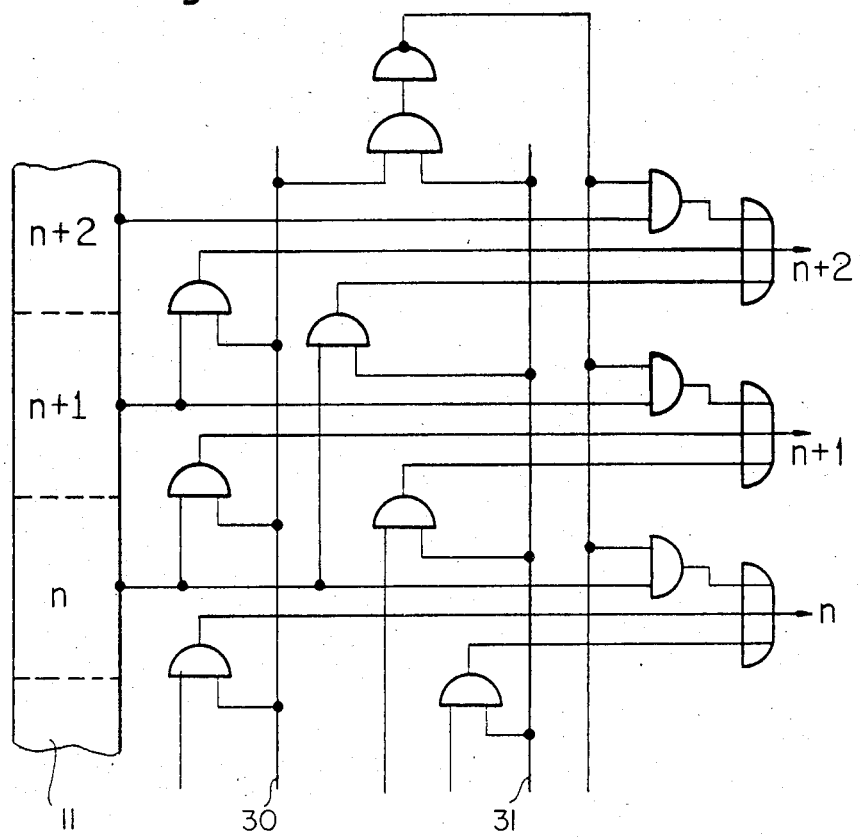
FIG. 3 is a detail of a circuit diagram to implement the modes of operation 3 and 4.

To illustrate, FIG. 3 shall serve. The raising of the zone number from the measured value to the focusing value however does not materialize from "n" to "n+1" or to "n+2", rather to "n+a". Here the distance zone "n+a" corresponds each time to twice the distance of the zone "n".

In the fifth mode of operation, the focusing must be at a distance between two measured distances, that is, the zone to be selected is the average of the measured zone numbers.

The memories 11 and 12 are needed to store the two measurements. After the two measurements have been performed, one of the N positions is occupied in each memory. Due to the logic linkage of the memory outputs shown in FIG. 4, the proper focusing value is obtained.

If for instance the zone "n+2" is obtained from the first measurement and the zone "n" from the second, then the logic level "1" is present on the output conductor 34 of the measurement memory 11 and on the output conductor 41 of the measurement memory 12. The focusing value "n+1" then is transmitted through the AND gate 43 and the OR gate 46 to the output of gate 46.

Again, measurements of the zones "n+1" and "n+3", also of the zones "n" and "n+4" result in the focusing value "n+2".

The direct logic linkage of the measurement signals to the control signals described herein to achieve the various modes of operation represents merely a simple embodiment restricted to automatic focusing systems with relatively small zone numbers N.

As regards focusing systems with high zone numbers, obviously it shall be more appropriate to ascertain the particular advantageous distance focusing values by computational operations, without thereby changing the principle of the invention.

We claim:

1. An automatic focusing system for photographic cameras, with an infrared light source, an infrared detector and a focusing optics mounted in front of the detector to focus the infrared radiation reflected from the object on the detector surface, where the detector is divided into two partial detectors each of which supplies a partial current of which the ratio depends directly on the object distance, characterized by the detector (5) being followed by an electronics (6-16) including a computing circuit (16) which by means of an objective-focusing system implements the objective-focus according to a preselection performed on one of the components (selection switch 15) of the electronics in one of the following several modes of operation
    (a) focus is on the object to be photographed,
    (b) extend the depth of field from the object toward the camera,
    (c) extend the depth of field from the object toward the rear
    (d) extend the depth of field from the object to infinity
    (e) extend the depth of field between two consecutively targeted objects.

2. Automatic focusing system per claim 1, characterized in that the electronics includes a computing unit (8) to form the quotient of the sum and difference of the two partial currents $J_A$ and $J_B$ in that an analog-digital converter with N digitizing steps is present to digitize that analog value, in that a control circuit (10) is provided which enters the digitzied measurement into at least one measurement memory (11) with N outputs, in that the computing circuit (16) follows the measurement memory and can be set by means of the selection switch (15) and a stop- or f/number- determining means (14) to one of the modes of operation, and in that the focusing system setting the object to one of the N distance zones is connected to the N outputs of the logic circuit (16).

3. Automatic focusing system per claim 2, characterized in that a second measurement memory (12) identical with the first measurement memory (11) is present to store a second measurement, and in that this second measurement memory also follows the control circuit (10).

4. Automatic focusing system per claim 3, characterized in that the output signals of the measurement memories can be changed in the logic circuit by actuating the preselection switch (15) and the f/number control (14).

* * * * *